United States Patent Office 2,717,675
Patented Sept. 13, 1955

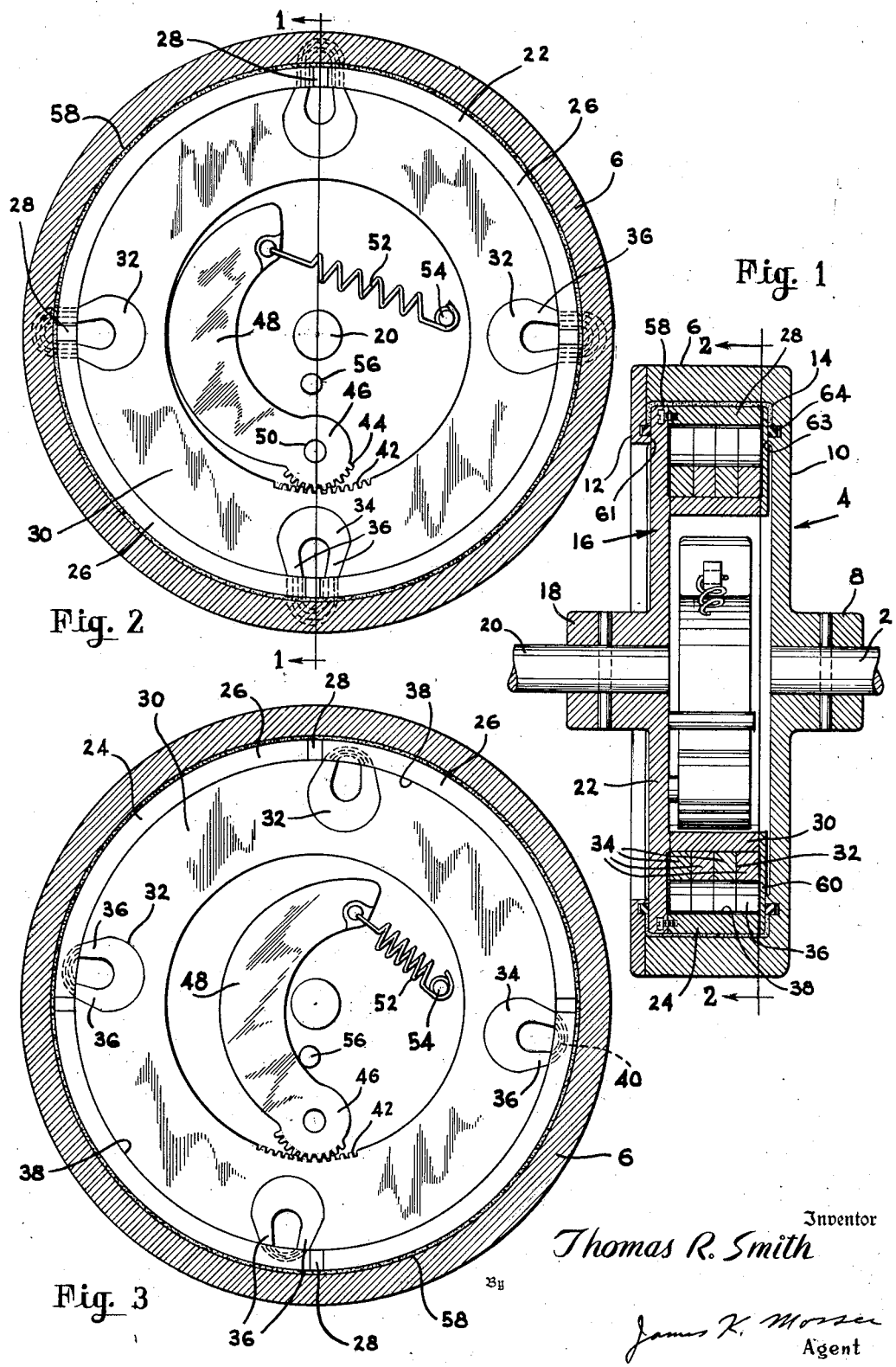

2,717,675

CENTRIFUGALLY OPERATED MAGNETIC FLUID CLUTCH

Thomas R. Smith, Newton, Iowa, assignor to The Maytag Company, Newton, Iowa, a corporation of Delaware Application December 21, 1951, Serial No. 262,810

10 Claims. (Cl. 192—21.5)

The invention relates to magnetic clutches, more particularly to magnetic clutches incorporating permanent magnets and it has for an object to provide improved apparatus therefor.

It is a further object of the invention to provide a permanent magnet type clutch which permits the prime mover or driving member to attain a predetermined speed before shifting the magnets into position for rotating the driven member.

In accordance with the present invention a driven member is provided with an annular drum surrounding but slightly spaced from a rim consisting of spaced sector shaped armatures which in turn are secured to a driving member or prime mover. Fitting closely within the confines of the rim is an annular ring carrying a plurality of embedded, spaced U-shaped permanent magnets which rotate with the driving member but are shiftable with respect thereto from a first to a second position by means of an eccentrically mounted centrifugally operated weight.

With the weight in its first or retracted position, the permanent magnets are located so that the flux from each magnet is short circuited through an adjacent armature. When the driving member is rotated, the weight moves outwardly and shifts the magnets to its second position where each pole of each magnet straddles opposite ends of adjacent armatures and the flux travels from one pole through the one end of one of the armatures through the drum of the driven member and back through the adjacent end of the other armature to the other pole.

In order to provide for an improved flux conducting path, the space or air gap between the driven drum and the armatures is filled with finely divided liquid suspended magnetic material. Thus, when the poles of the magnets are straddling adjacent armatures, a relatively efficient and effective flux path is provided for locking the driving and driven members together. However, should the load on the driven member exceed the magnetic locking effect of the magnetic field, the driven member will begin to slip. This provides a constant torque limiting clutch member which prevents overloading of the driving motor.

In accordance with the above, it is another object of the invention to provide a permanent magnet type clutch with finely divided flux conducting particles between the driving and driven members.

It is still another object of the invention to provide a permanent magnet type clutch wherein the magnets are shifted from an active driving position to an inactive position by means of a centrifugally operated actuator.

It is yet another object of the invention to provide a permanent magnet type clutch wherein the output torque may be held relatively constant to avoid overloading of the driving motor or prime mover.

Other objects, features, capabilities and advantages are comprehended by the invention as will later appear and as are inherently possessed thereby.

Referring to the drawings:

Figure 1 is a diagrammatic longitudinal, vertical sectional view of a clutch incorporating permanent magnets in accordance with the invention and taken on the line 1—1 of Figure 2;

Figure 2 is a transverse, vertical sectional view of the permanent magnetic type clutch taken on the line 2—2 of Figure 1 and showing the magnets in their active position and with the centrifugal weight moved outwardly; and, Figure 3 is a transverse, sectional view similar to Figure 2 but showing the permanent magnets in their inactive position and with the centrifugal weight retracted.

Referring now more in detail to the drawings for one form of a magnetic clutch embodying permanent magnets as the locking means, there is shown a driven shaft 2 having one end connected in any suitable manner to a load (not shown) and the other end to a driven member 4 which comprises an outer annular flux conducting drum 6 formed integral with a hub 8, for engaging the driven shaft 2, through a web or disc construction 10. The opposite or open end of the drum has an annular radially inwardly directed skirt or cap 12 secured thereto and positioned parallel with the web 10 to provide a pocket or recess 14 for the reception of a portion of a driving member 16. The driving member is rigidly secured through its hub 18 to one end of a driving shaft 20 which has its opposite end connected to any suitable electric motor or prime mover (not shown).

In addition to the hub 18, the driving member 16 comprises a web or disc portion 22 disposed parallel with the web 10 on the driven member and terminating adjacent the inner periphery of the drum 6, and an annular magnetic flux conducting ring or rim 24 formed by a plurality of sections or sector-shaped armatures 26 whose outer periphery is closely spaced to the inner periphery of the drum within the pocket 14 and is rigidly secured to the web 22 in any suitable manner. Each sector 26 is spaced or separated by a block of non-magnetic material 28, such as, for example, copper, or the like, to provide a plurality of separate armatures, and since the rim is rigidly secured to the driving member 16, it will rotate with it.

Within the confines of the annular sectored rim 24 and closely spaced thereto, there is provided an annular nonmagnetic member or ring 30, which has embedded therein, in any suitable manner, a plurality of groups of spaced outwardly directed U-shaped permanent magnets 32, equal in number to the number of armatures 26 forming the rim 24 and spaced so each group is positioned adjacent one end of an adjacent armature, when the ring is in its inactive or retracted position. While each group of magnets 32 is shown as comprising four separate permanent magnets 34 disposed side by side, it is to be understood that any number more or less may be incorporated in each group and the total number of groups of magnets may be varied as long as each group has its own individual armature, and either one of the above may be varied depending upon design conditions.

The ring 30 carrying the permanent magnets 34 is relatively rotatable or shiftable with respect to the driving member 16 at certain intervals; however, under normal conditions it rotates in unison with the driving member. As shown more clearly in Figures 2 and 3, it can be seen that the pole pieces 36 of each magnet 34 project radially outwardly and are disposed in close proximity to the inner periphery 38 of the sectored armatures 26, and as shown more particularly in Figure 3, the pole pieces of each group of magnets are bridged by one of the armatures 26 and a separate or individual armature is provided for each group 32 of permanent magnets. With the armatures 26 bridging the outwardly projecting poles 36 of each magnet, it is obvious the major portion of the flux 40 flows between the pole pieces through the adjacent portion of its mating armature and very little, if any, flux will extend outwardly beyond each particular armature. Also, with the magnets in the position as described above, the driving and driven members 16 and 4, respectively, are relatively free from interference and may be rotated independently of each other, because there is no connection locking them together.

In order to provide means for shifting the embedded magnets from the inactive position shown in Figure 3 to the active position shown in Figure 2, the inner diameter of the annular magnet carrying ring 30 has a toothed rack portion 42 adapted to mesh with a sector gear 44 formed on the hub portion 46 of a centrifugally operated weight 48. This weight is eccentrically mounted to pivot about a stub shaft 50 carried by the vertical wall 22 of the driving member 16, and a tension spring means 52 having one end connected to the driving member through a pin 54 and the other end to the free end of the weight opposes outward movement of the weight and pulls it back to a central position against a stop 56 when the speed of rotation of the driving member drops below a predetermined value. Also, the spring holds the inner annular ring 30 carrying the magnets 34 in the position shown in Figure 3 wherein the armatures short circuit the flux 40 between the poles of the magnets, thereby reducing to a minimum the flux moving outward into the driven drum 6.

When the driving member 16 is started from rest and is rotated below a predetermined speed, the centrifugally operated weight 48 is held in its innermost position by the tension spring 52 and it necessarily rotates with the driving member because of the stub shaft 50 and, of course, the magnet carrying ring 30 is rotated along with the weight. However, when the driving member 16 exceeds a predetermined high speed, centrifugal force overcomes the spring loading and the free end of the weight 48, pivoting about the stub shaft 50, moves outwardly. As the weight pivots, the sector gear 44 on the hub portion of the weight meshing with the rack 42 in the annular ring 30 causes the same to rotatably shift relative to the rim 24 while it is rotating with the driving member 16, and thus move the pole pieces 36 of the magnets 34 to straddle the adjacent ends of the oppositely disposed armatures, as clearly shown in Figure 3.

Since each armature is separated by a small section of non-magnetic material 28, it is obvious the flux leaving one of the poles 36 passes through the end of its adjacent armature, across and into the drum 6 of the driven member 4 and hence back to the other end of the adjacent armature to the opposite pole piece 36. This shift in direction of magnetic flux from its short circuiting position, as shown in Figure 3, into the drum 6, as shown in Figure 2, causes the magnetic flux emanating from magnets 32 and passing through drum 6 to sweep around the rim of drum 6 as drive member 16 is rotated at its predetermined speed. It is well known in the art that the degree of coupling achieved between members 16 and 4 due to the induction of Eddy current and hysteresis losses in drum 6 is dependent upon such factors as the strength and relative angular velocity of the flux sweeping drum 6 as well as the type of metal chosen in the formation of drum 6.

If it is found that this type coupling is insufficient to drive member 4 satisfactorily, then the actuating mechanism described may be used in an alternative type coupling which reduces and, for the most part, eliminates the "slip" between members 16 and 4. In this type coupling the space between armature members 26 and the outer periphery of sectored rim 24 is filled with very fine iron particles 58 or other good flux conducting material suspended in oil or other fluid in a colloidal state to provide a flux conducting mass. While not appreciably massed together under low speed conditions illustrated by Figure 3, the iron particles 58 quickly cluster opposite the magnetic poles 36 when ring 30 is moved into the position shown in Figure 2. This massing of particles 58 along the lines of magnetic force passing through them produces a mechanical drag on drum which in turn is gradually accelerated with drive member 16 until it becomes "locked in" with drive member 16. Once drum 6 is rotating in unison with member 16, movement of drum 6 relative to member 16 by "slip" is achieved only by application of forces of shear on these particles.

While magnetic flux acts between the drum and rim, means must be provided to prevent this fluid flux conducting material 58 from collecting between the rim 24 and permanent magnets 34 because fine iron particles could build up between the pole pieces 36 of the permanent magnets and short circuit the flux therethrough instead of directing the same toward the drum. To accomplish this the magnets 34 are covered by the wall 22 of the driving member on the one side of the rim 24 and an annular skirt 60 on the opposite side which extends downwardly to cover the magnets to prevent the possibility of the fluid material from contacting the magnets. At the same time, the wall 22 and skirt 60 may act as centering or thrust bearing surfaces to maintain the annular magnet carrying ring 30 in its proper axial position.

The skirt 12 secured to the drum 6 has an inwardly directed bearing surface or shoulder 61 adjacent its inner edge opposite a similar bearing surface 63 on the disc 10, and the shoulders or bearing surfaces engage opposite sides of the driving member to provide thrust shoulders to prevent or limit relative axial shifting movement of the driving and driven members. Both the skirt and disc have recesses for the reception of annular type seals 64 which bear against the web 22 and skirt 60 to confine the suspended iron particles within the space 14. It is to be understood, of course, that various other means may be provided to seal off the space between the driving and driven members and to prevent contact of the fluid magnetic flux conducting material with the permanent magnets.

Briefly, the operation of a magnetic clutch of this type is as follows: Assuming first that the driving member 16 is stationary, as shown in Figure 3, the weight 48 will be held in its innermost position against the stop 56 by the spring 52 and the groups of permanent magnets 32 will be in a first position wherein each armature 26 short circuits the magnetic flux at the open pole ends 36 of each group through independent armatures 26 forming the rim 24, and very little, if any, flux will extend or pass outward into the drum 6 of the driven member 4. Under these conditions, the driving and driven members may be moved relative to each other with only a small degree of drag acting on drum 6 due to the viscosity of the fluid present between armature member 26 and drum 6.

When the driving motor is energized, the driving member 16 is free to rotate therewith, because of the short circuiting of the flux, without imposing a high starting load or torque on the motor. This permits the motor to start and attain a sufficiently high speed to allow the starting winding to be cut out of the motor circuit. After the motor attains a predetermined speed, the free end of the weight 48 under the influence of centrifugal force moves outwardly against the tension of the spring 52, and in so doing it pivots at its anchored end about the stub shaft 50 and the sector gear 42, meshing with the rack 40 on the annular ring 30, shifts the same with respect to the rim 24 on the driving member into a second or driving position, as shown in Figure 2. As the permanent magnets are moved into this position, it can be seen that each pole 36 of each magnet 34 straddles the ends of adjacent armatures on the ring, and the non-magnetic material 28 between the armatures directs or permits the flux to flow across the ends of each armature through the fluid suspended fine iron particles 58 in the space 14 and into the drum 6. This flux tends to magnetically lock the two members together and the driven member, being pulled by the moving or rotated flux, will then be accelerated until it rotates in unison with the driving member. Should the driven member be loaded excessively or above the design limitations of the unit, however, the magnetic lock will permit the driven member to slip relative to the driving member and thus automatically limit the total load than can be applied to the motor.

When the driving motor is deenergized and the driving member reaches a predetermined low speed, the spring 52 overcomes the centrifugal force acting on the weight and moves the same inwardly, which in turn shifts the ring 30 carrying the magnets 34 back to its first position to short circuit the magnetic flux in each permanent magnet through its respective armature and thereby disengage the clutch.

From the foregoing, it can be seen that a relatively simple magnetic clutch has been provided which permits the motor to start under no load and, upon attaining full operating speed, is such as to limit the total load imposed on the driving motor. Also, there has been provided a magnetic clutch wherein permanent magnets are utilized to lock the driving and driven members together and the necessity of coils or winding, lead wires and the like, which are normally required in electro-magnetic clutches, has been eliminated. In addition, a fluid magnetic mass has been provided to eliminate the air gap loss between the driving and driven members.

While I have herein described and upon the drawings shown an illustrative embodiment of the invention, it is to be understood that the invention is not limited thereto but may comprehend other constructions, arrangement of parts, details and features without departing from the spirit of the invention.

It is claimed:

1. In a magnetic clutch, the combination of a driven member, a driving member, a plurality of spaced sector-shaped flux conducting armatures rigidly secured to said driving member adjacent said driven member and having their adjacent edges separated, fluid suspended magnetic flux conducting material disposed between said armatures and said driven member a plurality of spaced U-shaped permanent magnets disposed adjacent said armatures, said spaced magnets each being disposed adjacent an independent armature, means for holding said magnets in spaced relation to each other, a centrifugally operated weight carried by said driving member, means for interconnecting said weight and said magnet holding means for shifting the same from one position whereat said magnets are short circuited by said armatures to a second position where the magnetic flux emanating from said magnets establishes a magnetic circuit between said armatures and said driven member through said flux conducting material.

2. A magnetic clutch comprising a driven member provided with a flux conducting drum, a driving member having a plurality of sector-shaped spaced armatures secured thereto with one side disposed adjacent said drum, an annular ring, permanent magnets carried by said ring disposed adjacent the other side of said armatures, means including a centrifugally operated weight for shifting said permanent magnets from one position where the flux is short circuited through said armatures to a second position wherein the flux is directed through the drum on said driven member, and fluid suspended magnetic flux conducting material disposed between said armatures and said drum.

3. A magnetic clutch comprising a driven member provided with a magnetic flux conducting drum, a driving member including a rim formed from a plurality of sector-shaped armatures, an annular ring disposed in close proximity to said armatures, a plurality of U-shaped permanent magnets carried in said ring and positioned adjacent said armatures so that the flux emanating from said magnets is short circuited in said armatures, fluid suspended magnetic material disposed between said rim and said drum, and centrifugally operated means for moving said annular ring carrying said magnets to straddle adjacent armatures to direct the flux through said fluid suspended material into said flux conducting drum to lock said driven member to said driving member.

4. In a magnetic clutch, the combination of a rotatable driven member provided with a magnetic flux conducting drum, a rotatable driving member having an annular rim comprising a plurality of spaced sector-shaped magnetic armatures with blocks of non-magnetic material therebetween encompassed by said drum, an annular ring of non-magnetic material encompassed by said rim and disposed in close proximity to said armatures and rotatable with said driving member, said ring being provided with a rack, a plurality of spaced U-shaped permanent magnets carried by said ring with each magnet positioned adjacent a separate armature so that the flux emanating from said magnets is short circuited in said armatures, fluid suspended magnetic material disposed between said rim and said drum, and a centrifugally operated weight pivoted on said driving member eccentric to its axis of rotation with a sector gear formed adjacent said pivoted end for engaging said rack to move said annular ring carrying said magnets to straddle the ends of adjacent armatures to direct the flux through said fluid suspended magnetic material into said flux conducting drum to thereby rotate said driven member with said driving member.

5. A magnetic clutch, comprising a rotatable driven member provided with a flux conducting drum, a rotatable driving member having an annular rim comprising a plurality of magnetic sector-shaped armatures with annular non-magnetic gaps therebetween encompassed by said drum, an annular ring encompassed by said rim and disposed in close proximity to said armatures and rotatable with said driving member, a plurality of spaced U-shaped permanent magnets carried by said ring with each magnet positioned adjacent a separate armature so that the flux emanating from said magnets is short circuited in their respective armature, fluid suspended magnetic material disposed between said rim and said drum, centrifugally operated means carried by said driving member for moving said annular ring carrying said magnets to a position straddling said non-magnetic gaps to thereby direct the flux through said fluid suspended material into said drum to rotate said driven member with said driving member when the same is rotated above a predetermined speed, and means for returning said annular ring carrying said magnets to the first mentioned position adjacent separate armatures to thereby short circuit the flux in said armatures to disengage said driving member from said driven member when said driving member is rotated below a predetermined speed.

6. In a magnetic clutch, the combination of a rotatable driven member provided with a magnetic flux conducting drum, a rotatable driving member having an annular rim comprising a plurality of separate sector-shaped armatures spaced circumferentially apart by segments of non-magnetic material encompassed by said drum, an annular non-magnetic ring encompassed by said rim and disposed in close proximity to said armatures and carried by said driving member, a plurality of U-shaped permanent magnets carried by said ring and disposed in a first position adjacent separate armatures so that the flux emanating from each magnet is short circuited by the adjacent armature, fluid suspended magnetic material disposed between said rim and said drum, centrifugally operated mechanism carried by said driving member and operable above a predetermined speed to move said magnets to a second position to straddle the ends of adjacent armatures to direct the flux through said fluid suspended material into said flux conducting drum to rotate said driven member with said driving member, and means for returning said magnets to their first mentioned position adjacent said armatures to short circuit the flux from said magnets to thereby disconnect said driving member from said driven member when said driving member is rotated below a predetermined speed.

7. In a magnetic clutch, the combination of a rotatable driven member provided with a magnetic flux conducting drum, a rotatable driving member having an annular rim comprising a plurality of magnetic sector-shaped armatures spaced apart by integral plugs of non-magnetic material encompassed by said drum, an annular non-magnetic ring encompassed by said rim and disposed in close proximity to said armatures and rotatable with said driving member, said ring having an internal rack thereon, a plurality of U-shaped permanent magnets carried in said ring and normally disposed in a first position adjacent said armatures so that the flux emanating from said magnets is short circuited in said armatures, fluid suspended magnetic material disposed between said rim and said drum, a centrifugally operated weight mounted adjacent one end on a pivot carried by said driving member eccentric of its axis of rotation and having the other end free, a spring attached by one end to said free end of said centrifugally operated weight and attached by the other end to said driving member to bias said centrifugally operated weight toward the axis of rotation of said driving member to normally position said ring with said magnets in a disengaged position when said driving member is rotated below a predetermined low speed, a stop to limit the inward movement of said centrifugally operated weight, and an integral sector gear on said centrifugally operated weight adjacent said pivot meshing with said internal rack to move said annular ring carrying said magnets to straddle adjacent armatures to direct the flux through said fluid suspended material into said flux conducting drum to rotate said driven member with said driving member when said driving member is rotated above a predetermined high speed.

8. In a magnetic clutch, the combination of a driven member, a driving member having a plurality of adjacently disposed and spaced armatures, permanent magnets carried by said driving member, said armatures being disposed between said magnets and said driven member, fluid suspended magnetic flux conducting material disposed between said armatures and driven member to provide a magnetic flux conducting path therebetween, and speed responsive means for rotatably shifting said magnets with respect to said armatures from a first position where the flux is short circuited by said armatures to a second position where the flux is directed through adjacent portions of said armatures and the fluid suspended flux conducting material to said driven member to provide a coupling between said driving and driven members.

9. A magnetic clutch comprising a driven member, a driving member having a plurality of spaced and adjacently disposed armatures, non-magnetic spacing members disposed between the spaced ends of said adjacently disposed armatures, fluid suspended magnetic flux conducting material disposed between said armatures and driven member to provide a magnetic flux conducting path therebetween, permanent magnet means carried by said driving member in proximity to said armatures, said armatures being disposed between the poles of said magnets of said driven member, and means for relatively rotatably shifting said permanent magnet means and said armatures to provide a driving connection between said driving and driven members through portions of adjacent armatures and the fluid suspended flux conducting material.

10. A magnetic clutch comprising a driven member, a driving member having a plurality of spaced and adjacently disposed armatures mounted thereon adjacent said driven member, non-magnetic spacing means disposed between the spaced adjacent ends of said armatures to provide a ring, fluid suspended flux conducting material carried between said armatures and driven member, permanent magnets carried by said driving member, said spaced armatures being mounted between said driven member and said magnets, and means for relatively rotatably shifting said permanent magnets and armatures to short circuit the flux of the magnets by said armatures in one position to a second position to permit the flow of flux to said driven member through portions of adjacent armatures and the fluid suspended flux.

References Cited in the file of this patent

UNITED STATES PATENTS

| 2,193,214 | Winther et al. | Mar. 12, 1940 |
| 2,437,871 | Wood | Mar. 16, 1948 |
| 2,503,916 | McIverr | Apr. 11, 1950 |
| 2,537,335 | Edwards | Jan. 9, 1951 |
| 2,557,140 | Rozdowitz | June 19, 1951 |
| 2,604,198 | Stephenson | July 22, 1952 |
| 2,605,875 | Stephenson | Aug. 5, 1952 |
| 2,629,471 | Rabinow | Feb. 24, 1953 |
| 2,671,545 | Petroff | Mar. 9, 1954 |

FOREIGN PATENTS

| 984,127 | France | Feb. 21, 1951 |